Nov. 29, 1960 J. A. RAJCHMAN 2,962,719

MAGNETIC SYSTEM USING TRANSFLUXORS

Original Filed Dec. 7, 1954 6 Sheets-Sheet 1

INVENTOR.
Jan A. Rajchman
BY Morris A. Rabkin
ATTORNEY.

INVENTOR.
Jan A. Rajchman
BY
Morris A. Rabkin
ATTORNEY.

INVENTOR.
Jan A. Rajchman
BY Morris Rahm
ATTORNEY.

Nov. 29, 1960 J. A. RAJCHMAN 2,962,719
MAGNETIC SYSTEM USING TRANSFLUXORS
Original Filed Dec. 7, 1954 6 Sheets-Sheet 4

INVENTOR.
Jan A. Rajchman
BY Morris ... Rabkin
ATTORNEY.

Nov. 29, 1960 J. A. RAJCHMAN 2,962,719

MAGNETIC SYSTEM USING TRANSFLUXORS

Original Filed Dec. 7, 1954 6 Sheets-Sheet 5

INVENTOR.
Jan A. Rajchman
BY
Morris L. Rahkin
ATTORNEY.

Nov. 29, 1960 J. A. RAJCHMAN 2,962,719

MAGNETIC SYSTEM USING TRANSFLUXORS

Original Filed Dec. 7, 1954 6 Sheets-Sheet 6

INVENTOR.
Jan A. Rajchman
BY
Morris L. Rabin [signature]
ATTORNEY.

2,962,719

MAGNETIC SYSTEM USING TRANSFLUXORS

Jan A. Rajchman, Princeton, N.J., assignor to Radio Corporation of America, a corporation of Delaware Original application Dec. 7, 1954, Ser. No. 473,709. Divided and this application Sept. 4, 1956, Ser. No. 607,780

20 Claims. (Cl. 340—174)

This invention relates to magnetic systems, and particularly to methods of and means for controlling an electric signal by means of such systems.

This application is a division of my copending application filed December 7, 1954, Serial No. 473,709, entitled Magnetic Systems, and assigned to the assignee of the present invention.

In a copending application, Serial No. 455,725, filed by Jan A. Rajchman and Arthur W. Lo, on September 13, 1954, entitled Magnetic Systems, various embodiments of a transfluxor are described. These transfluxors are described as being operated with two conditions of magnetic response to an A.C. signal. The one or the other response condition is established by a suitable setting signal. In one response condition, the A.C. signal is transmitted to an output device. In the other response condition, the A.C. signal is blocked.

It is an object of the present invention to provide an improved magnetic system characterized by a continuous range of response conditions, wherein each of the response conditions corresponds to one of a plurality of setting signals, the system being operative to control electric signals carrying intelligence or power.

Another object of the present invention is to provide an improved method of operation of a transfluxor which is set by electrical signals whose magnitude may vary throughout a continuous range, the transfluxor being operative to control the transmission of electric signals for an indefinite time in accordance with a setting signal.

Still another object of the present invention is to provide an improved transfluxor, of the kind set forth, which is characterized by a wide range of response conditions.

Yet another object of the present invention is to provide an improved magnetic system by means of which an output signal is furnished in accordance with the amplitude of a setting input signal and the amplitude of a driving signal.

Briefly, a transfluxor is comprised of magnetic material characterized by substantial saturation at remanence. There are a plurality of distinct closed flux paths in the material. The plurality of distinct paths can be achieved by fabricating two or more apertures in the material. Each closed path is then taken about one or more of the apertures. A selected one of the flux paths has at least two portions each respectively in common with two other different flux paths. Excitation means are provided selectively to excite the two portions of the selected path either to the same state of saturation at remanence, along the selected path, or to opposite states of saturation at remanence along the selected path. An alternating magnetizing current is employed to apply alternating magnetizing forces along the selected path. By suitable means, for example an output winding linking the selected path, a response may be derived which is dependent upon whether the selected path portions are in the same state or in opposite states of remanence with respect to the selected path.

According to the present invention, a selected flux path has two portions. A first portion is saturated with flux in a first sense with reference to the selected path. A second portion is in common with a different control flux path. Means are provided to divide this common portion into two zones with saturating flux in opposite senses with reference to the selected path. When a first magnetizing force is applied along the selected path in the second sense opposite the first sense, the flux in only one (a first) of the zones is reversed, the flux in the second zone being already in the second sense. At the same time, a corresponding amount of flux is reversed in the one portion due to the "conservation of flux." When a later, second magnetizing force is applied along the selected path in the first sense, this corresponding amount of flux in each of the two portions is returned to its initial state of saturation in the first sense. No greater change of flux can occur in the first portion of the selected path which is now again completely saturated in the first sense. Because of the "conservation of flux," only the first zone is returned to its initial state of saturation, and the flux in the second zone remains unchanged during this second application of magnetizing force, as well as during the first.

The relative sizes of the two zones can be set selectively by a controlling signal such that the size of the first zone is varied from a zero size (that of non-existence) to a maximum size including the entire common portion. By applying an alternating magnetizing force along the selected path, the flux is repeatedly reversed in the first zone. An output voltage is induced in an output winding linking the selected path each time a flux reversal is produced along the selected path.

The amount of changing flux is proportional to the size of the first zone, or stated differently, to the minimal cross-sectional area of the first zone. The amplitude of the controlling signal operates to vary the relative sizes of the two zones. The greater the size of the first zone, the greater the output voltage induced in the output winding because the flux changes in the selected path are then greater.

In certain of the embodiments described herein, the means used for changing the relative sizes of the two zones comprises various windings in apertures with parallel axes in a plate of saturable magnetic material. In other embodiments described herein, the means used for changing the relative sizes of the two zones includes windings in apertures with orthogonal axes. Various methods of arranging the transfluxors of the present invention in combination with an output load are also described.

The invention will be more fully understood, both as to its organization and method of operation, from the following detailed description when read in connection with the accompanying drawings in which.

Figure 1:
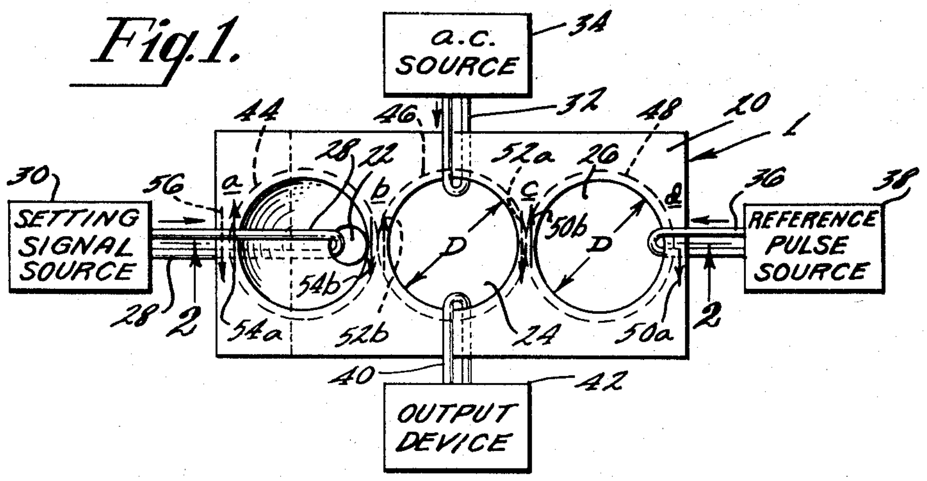
Fig. 1 is a schematic diagram of a magnetic system according to the invention, which employs a three-apertured transfluxor, of which one aperture is conical.

With reference to Fig. 1, there is shown a magnetic system 1 including a magnetic body comprising a plate 20 having a setting aperture 22, a driven aperture 24 and a reference aperture 26. The apertures 24 and 26 are cylindrically-shaped and each may be of the same diameter "D." The setting aperture 22 is shaped in the form of an inverted, oblique frustum. Any plane through the plate 20 and parallel to the top surface of the plate 20 intersects the surface of the wall of the aperture 22 in a circle. The radius *r* of each of the cross-sectional circles varies linearly with the thickness *t* of the plate 20. The radius *r* has a maximum value at the top surface of the plate 20 and a minimum value at the bottom surface of the plate 20. A setting winding 28 is linked to the flux path about the setting aperture 22 by passing the winding along the top of the plate 20, then through the aperture 22, and then along the bottom of the plate. Each terminal of the setting winding 28 is connected to a setting signal source 30. An A.C. winding 32 is linked to the flux path about the driven aperture 24 by passing the winding 32 along the top of the plate 20, then through the aperture 24, and then along the bottom of the plate. Each terminal of the A.C. winding 32 is connected to an A.C. source 34. A reference winding 36 is linked to the flux path about the reference aperture 26 by passing the winding 36 along the top of the plate 20, then through the aperture 26, and then along the bottom of the plate. Each terminal of the reference winding 36 is connected to a reference pulse source 38. An output winding 40 is linked to the flux path about the driven aperture 24 by passing the winding 40 along the top of the plate 20, then through the output aperture 24, and then along the bottom of the plate 20. Each terminal of the output winding 40 is connected to an output device 42.

Figure 2:
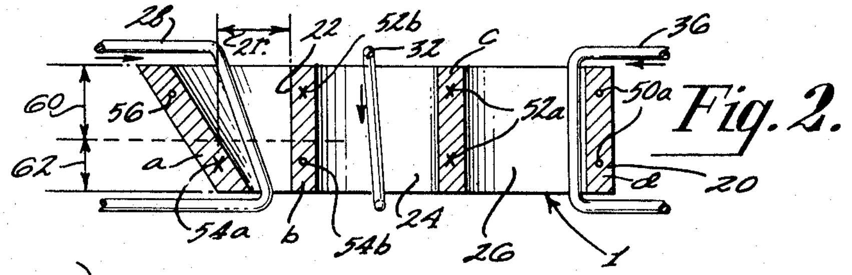
Fig. 2 is a cross-sectional view along the line 2—2 of the transfluxor of Fig. 1.

The cross-sectional line 2—2 of Fig. 1 is taken along the most restricted portion of the material limiting the apertures. In Fig. 2, the material of the cross-sectional area between the left-hand edge (as viewed in the drawing) of the plate 20 and the inside wall of the setting aperture 22 is identified as leg *a*. The material of the cross-sectional area between the inside wall of the setting aperture 22 and the inside wall of the driven aperture 24 is identified as leg *b*. The material of the cross-sectional area between the inside wall of the driven aperture 24 and the inside wall of the initial setting aperture 26 is identified as leg *c*. The material between the inside wall of the initial setting aperture 26 and the right-hand edge of the plate 20 is identified as leg *d*. The cross-sectional area of the leg *a* is uniform throughout. The cross-sectional area of each of the legs *b*, *c* and *d* is substantially the same along the cross-sectional line 22 of Fig. 1.

The plate 20 is a transfluxor which, for example, may be molded from a powder-like manganese-magnesium ferrite and annealed at a suitably high termperature to obtain the desired magnetic characteristics. Certain other ceramic-type, rectangular hysteresis loop, magnetic materials and certain metallic materials, such as mo-permalloy, may be employed, if desired. The setting signal source 30, the A.C. source 34, and the reference pulse source 38 each may be comprised of any suitable electronic device, for example one employing vacuum-tubes, or a pulse source employing magnetic cores, or one employing transfluxors. The output device 42 may be any suitable device capable of utilizing an output voltage induced in the output winding 40 by a change in flux in the flux path about the driven aperture 24. Although the various windings are shown as single-turn, multi-turn windings may be employed if desired. The arrows adjacent the respective windings 28, 32 and 36 are used to indicate the direction of a conventional current flow (in a direction opposite to the electron flow) in the respective windings. For convenience of description, a current flow in a winding in the direction of an arrow adjacent thereto is taken to be positive.

There is an individual flux path about each of the apertures. The flux path about the setting aperture 22 is a control flux path and is represented by the dotted line 44, the flux path about the driven aperture 24 is represented by the dotted line 46, and the flux path about the reference aperture 26 is represented by the dotted line 48. The flux path 46 is the selected path and has a first portion included in the leg *c* which is in common with the flux path 48, and a second portion included in the leg *b* which is in common with the flux path 44.

The convention adopted in the above-mentioned application Serial No. 455,725, in respect to the senses of flux flow, and the corresponding states of saturation at remanence of the material, is adopted herein. Briefly, there are two senses of flux flow around a closed path. A positive-current flowing into a surface bounded by the path produces a clockwise flux flow in the path. One state of saturation at remanence, with reference to a closed flux path, is that in which the saturating flux is directed in a clockwise sense (as viewed from one side of the surface) around the closed path; and the other state of saturation at remanence is that in which the saturating flux is directed in the counterclockwise sense (as viewed from the same side of the surface) around the closed path. The convention is adopted that the upper horizontal loop intersection with the vertical flux axis is the P (positive) state of saturation at remanence and corresponds to the one state with reference to the closed flux path; and that the lower horizontal loop intersection with the vertical flux axis is the N (negative) state of saturation at remanence and corresponds to the other state with reference to the closed flux path.

*Arrangement for on-off operation*

The operation of the magnetic system of Fig. 1 is as follows: Assume that a positive-going current pulse is applied to the reference winding 36 by the pulse source 38. This current pulse causes a clockwise flux flow about the reference aperture 26, as indicated by the solid arrows 50*a* and 50*b*. The amplitude of the reference pulse is made sufficient to establish a saturating flux in the nearby legs *c* and *d* but insufficient to cause a noticeable flux change in the distant legs *a* and *b*. The state of saturation at remanence of each of the legs *c* and *d* with reference to the flux path 46, upon the termination of the reference pulse, is indicated by the points $c_1$ and $d_1$ of the respective hysteresis curves 5 and 7 of Fig. 3. The legs *c* and *d* are at opposite states of saturation with reference to the flux path 46, the leg *c* being saturated at remanence in the state N and the leg *d* being saturated at remanence in the state P. Note that the flux flow is in the clockwisesense along the path 48. Therefore, both the legs *c* and *d* are saturated at remanence in the state P with reference to the path 48. After the application of the reference pulse, the source 38 can be disconnected from the system because this pulse is used only for the purpose of establishing a reference flux in the leg *c*.

Figure 3:
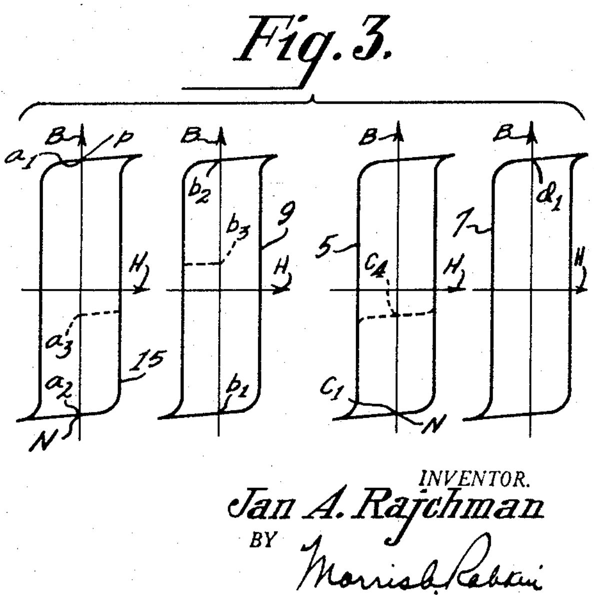
Fig. 3 is an idealized representation of the separate hysteresis loops relating to the legs *a, b, c* and *d* of the transfluxor of Fig. 1.

During the following description, the states of saturation of the respective legs are, conveniently, taken with reference to the output flux path 46. The respective curves 15, 9, 5 and 7 of Fig. 3 are idealized curves of the magnetic induction B versus the magnetizing force H for the respective legs *a*, *b*, *c* and *d* of Fig. 1. No attempt has been made to reproduce the exact hysteresis characteristics of the respective legs. The idealized curves of Fig. 3, and all other idealized hysteresis curves herein, are used qualitatively only in explaining the operation of the various transfluxors employed in the magnetic systems of the present invention. In passing, it may be noted that the two major characteristics of the rectangular material in respect to the shape of the curve and the saturation at remanence, as shown by the curves, are substantially in accordance with those of the known curves for rectangular-type materials.

Assume, now, that a positive-going current pulse is applied to the setting winding 28 by the setting signal source 30. Further, assume that the amplitude of this setting pulse is sufficient to establish a saturating flux in the near legs *a* and *b*, but insufficient to cause any noticeable flux change in the distant legs *c* and *d*. This setting pulse produces a clockwise flux flow along the path 44 as shown by the solid arrows 54*a* and 54*b* in the legs *a* and *b*. The state of saturation at remanence of each of the legs *a* and *b*, with reference to the path 46 upon termination of the signal pulse, is shown by the points $a_1$ and $b_1$, on the respective hysteresis curves 15 and 9 of Fig. 3. The legs *a* and *b* are at opposite states of saturation at remanence with reference to the path 46, the leg *a* being saturated at remanence in the state P and the leg *b* saturated at remanence in the state N. Note, however, that the legs *b* and *c* are saturated in the same state of saturation at remanence with reference to the path 46. Therefore if, now, an A.C. current cycle is applied to the A.C. winding 32 by the A.C. source 34, the magnetizing force produced by a first, positive phase of the A.C. current causes a reversal in the sense of flux flow along the path 46 to the clockwise sense. The magnetizing force produced by the following negative phase of the A.C. current again reverses the sense of flux flow along the path 46 to the initial counterclockwise sense. The sense of flux flow can be reversed an indefinite number of times by continuing to apply the driving A.C. current. A voltage is induced in the output winding 40 upon each reversal of flux in the path 46.

Assume, now, that a negative-going, setting pulse of the same amplitude as the prior setting pulse is applied to the winding 28 by the setting signal source 30. This setting pulse produces a counterclockwise flux in the path 44 as shown by the dotted arrows 56 and 52*b* in the legs *a* and *b* respectively. The state of saturation at remanence of each of the legs *a* and *b*, with reference to the path 46, upon termination of this second setting pulse, is reversed. The leg *a* is now saturated at remanence in the state N, and the leg *b* is now saturated at remanence in the state P. Now the legs *b* and *c* are saturated at remanence in the opposite states of saturation with reference to the path 46. Consequently, if an A.C. current cycle is applied to the A.C. winding 32 by the A.C. source 34, substantially no flux change occurs in the path 46 for either phase of the A.C. current. The reversal in the sense of the flux flow does not occur because one of the two legs *b* and *c* is already saturated at remanence in the sense of the magnetizing force and, therefore, any further increase of flux in the one or the other sense is blocked. It is apparent from the foregoing that the operation of the system of Fig. 1, as thus far described, is similar to the operation of the system of a three-apertured transfluxor described in the above-mentioned application Serial No. 455,725.

*Arrangement for continuous control operation*

Let us now assume that a third, positive, setting pulse is applied to the winding 28 by the setting signal source 30. Also assume that the amplitude of this third setting pulse is less than the amplitude of the two setting signals which were previously applied to the setting winding 28. The intensity of the magnetizing force produced by the smaller amplitude setting pulse is not sufficient to establish a saturating flux in all portions of the area included in the path 44. However, this magnetizing force is sufficient to establish a saturating flux in those portions of the legs *a* and *b* which have a cross-sectional area whose radius is equal to or less than a value $r_c$. The smaller setting pulse then divides the volume of material contained in the leg *a* and the common leg *b* into two distinct zones. The two zones are shown in Fig. 2 to be an upper zone 60 including all cross-sections of a radius greater than the value $r_c$, and a lower zone 62 including all cross-sections of a radius equal to or less than the value $r_c$. The X's and O's of Fig. 2 are used, respectively, to represent the tail and the point of the flux sense indicating arrows of Fig. 1. For example, the O and X in the upper zone 60 of the legs *a* and *b* of Fig. 2 correspond to the arrows 56 and 52*b* of Fig. 1. The X and O in the lower zone 62 of the legs *a* and *b* of Fig. 2 correspond to the arrows 54*a* and 54*b* of Fig. 1.

Figure 4:
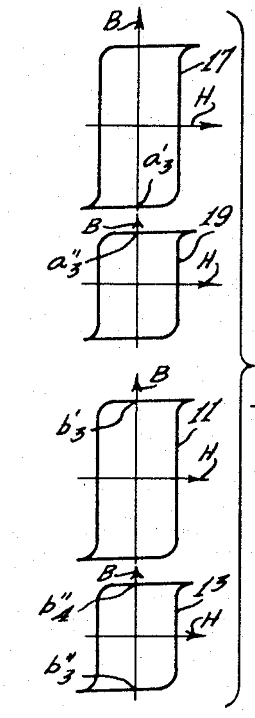
Fig. 4 is an idealized representation of hysteresis loops relating to the inner and outer zones in the material encompassing the conical aperture of the transfluxor of Fig. 1.

In Fig. 4, the hysteresis curves for the upper zone 60 and the lower zone 62 of the leg *a* are, respectively, shown by the curves 17 and 19. The hysteresis curves for the upper zone 60 and the lower zone 62 of the common leg *b* are, respectively, shown by the curves 11 and 13. The respective curves 15 and 9 of Fig. 4 are a composite of the corresponding curves 17 and 19 for the leg *a*, and 11 and 13 for the leg *b*. The difference in height along the B axis between the curves 17 and 19, and the curves 11 and 13 of Fig. 4, is used to indicate the flux distribution in the respective zones. That is, for a given flux density and the assumed value of $r_c$, the upper zone 60 includes a larger proportion of the flux than the lower zone 62. The states of saturation at remanence, with reference to the path 46, of the material in each of the portions of the legs *a* and *b* which are included in the upper zone 60, upon the termination of this third input signal, are respectively represented by the points $a_3'$ and $b_3'$ of the curves 17 and 11 of Fig. 4. The states of saturation at remanence, with reference to the path 46, of the material in each of the portions of the legs *a* and *b* which are included in the lower zone 62, upon the termination of the third setting signal, are respectively represented by the points $a_3''$ and $b_3''$ of the curves 19 and 13 of Fig. 4. Note that the common portion of material in the upper zone 60 of the leg *b*, and the corresponding portion of material in the leg *c*, are in opposite states of saturation at remanence, with reference to the path 46, as indicated by the points $b_3'$ (Fig. 4) and $c_1$ (Fig. 3). Note also that the common portion of material in the lower zone 62 of the leg *b*, and the corresponding portion of material in the leg *c*, are both in the same state of saturation at remanence with reference to the path 46, as indicated by the points $b_3''$ (Fig. 4) and $c_1$ (Fig. 3). The points $a_3$ and $b_3$ of the composite curves 15 and 9 of Fig. 3 also represent the flux condition produced by the third setting pulse in the respective legs *a* and *b*.

Assume, now, that a cycle of A.C. current is applied to the A.C. winding 32 by the A.C. source 34. The first, positive phase of the A.C. current reverses the sense of flux flow in the lower zone 62 of the leg *b* and the corresponding portion of the leg *c* from the counterclockwise to the clockwise sense with reference to the path 46. The state of saturation at remanence with reference to the path 46 of the lower portions of the legs *b* and *c*, upon the termination of the first phase of the A.C., is shown by the point $b_4$ of the curve 13 (Fig. 4) for the leg *b*, and the point $c_4$ of the curve 5 for the leg *c*. The following negative phase of the A.C. current reverses the sense of flux flow in these portions back to the counterclockwise sense with reference to the path 46, and so on.

Each time the sense of flux reverses in the lower zone, a corresponding output voltage is induced in the output winding 40. The amplitude of this output voltage is less than the amplitude of the voltage previously induced in the output winding during the on-off operation when all the flux in the legs *b* and *c* was changed from one sense to the other sense. A continuous range of output voltages can be produced by varying the amplitude of the input signal in order to change the relative volume of material included in the two different zones of the common leg *b*.

Observe that after the first, positive phase of the A.C. signal, all portions of the leg *b* are saturated in the state P as represented by the point $b_4$ of the curve 9 (Fig. 3). The two zones, however, are preserved by the leg *c* which has flux in opposite senses in two of its portions. After the succeeding, negative phase of the A.C., the flux distribution in the leg *b* is returned to that originally set by the controlling signal.

*Discussion of a theory explaining the operation of the continuous control device*

The following theory is proposed as a possible explanation as to the effect the setting pulse produces on the material. This explanation is not to be construed as a limitation of the invention. In an aperture, such as the aperture 22, the magnetizing force H exerted on the legs *a* and *b* can be considered, with sufficient accuracy for the present purposes, to be symmetrical about an axis of the aperture in any plane parallel to the top surface, even though the input winding does not exactly coincide with this axis. When this assumption is made, the ampere-turns *ni* (where *n* is the number of turns, and *i* is the amplitude of the setting current) linking the legs *a* and *b* is equal to a value of $2\pi r$H, where *r* is equal to a mean radial distance from the axis of the aperture. The magnetizing force $$H=\frac{ni}{2wr}$$

exerted on the limiting material at the various circular cross-sections is inversely proportional to the radius. This radius *r* may be taken, with sufficient accuracy for practical purposes, as the radius *r* mentioned hereinbefore. There is a value of magnetizing force known as the coercive force H*c* below which the magnetic field does not produce any permanent effect on, or substantially change, the value of the magnetic induction B already present in the material. Thus, for a given amplitude of setting current $i_c$, there is a radical distance $r_c$ for which the resultant magnetizing force is less than the required coercive force H*c*. A flux reversal is accomplished by the current $i_c$ in a first zone which includes all cross-sections having a radius equal to or less than the value $r_c$. The current $i_c$ does not produce any substantial effect on the material in the legs *a* and *b* in a second zone which includes all cross-sections having a radius greater than the value $r_c$. The transition region between the first and second zones is sharply defined because of the rectangular hysteresis characteristic of the material. Once the relative minimal cross-sectional area of material in the two zones, for example the zones 62 and 60, has been set by a first setting signal, the A.C. current can repeatedly reverse the flux in the lower zone 62 of the common leg *b*. A second, positive, signal current applied to the setting winding 24 can change the relative amount of material included in the respective two zones 62 and 60 of the leg *b*, if its amplitude is greater than the first setting signal. When the amplitude of the second setting signal is less than the amplitude of the first setting signal, the relative minimal cross-sectional area of the two zones remain unchanged because the flux is already established by the first setting signal, in the clockwise sense, in the portions of the legs *a* and *b* which are affected by the second signal.

*Applications of the continuous control system*

The system of Fig. 1 can be made responsive to every setting signal by arranging the setting signal source 30 so as to furnish a negative, resetting current before each new, positive signal is applied. Thus, a counterclockwise flux, with reference to the path 44, is established in all portions of the legs *a* and *b* by the resetting current. The following positive setting signal then sets the relative sizes of the upper and lower zones of the leg *b*.

The system of Fig. 1 can be operated as a peak current detector. For example, if a varying amplitude, positive-current wave is applied to the setting winding 28 by the setting signal source 30, the final size of the upper zone 60 and the lower zone 62 of the leg *b* is determined by the maximum amplitude of the current wave. By observing the relative amplitude of the voltage induced in the output winding 40, in response to a cycle of A.C. current applied to the A.C. winding 32, the peak amplitude of the incoming signal can be determined.

The continuous control system is also useful in telemetering applications where the controlled device is remotely located. In such case, the setting signal source may correspond to the device whose output is to be monitored. The monitored output signal is applied to the setting winding 28 to establish a counterclockwise flux in the lower zone 62 of the leg *b*. The A.C. source applies an A.C. current to the winding 32 to cause an output voltage to be induced in the output winding 40. This output voltage can then be transmitted by well-known means to the remotely located controlled device. An indefinitely long output signal can be furnished, or the transfluxor can be reset each time an output signal is supplied.

The system of Fig. 1 can be operated in the exact opposite manner in respect to the polarity of the setting signal. For instance, assume that a negative reference pulse is applied to the setting winding 36 by the reference pulse source 38. Now, if positive setting signals are applied to the setting winding 28 by the setting signal source 30, the transfluxor is unresponsive to either phase of the A.C. current applied to the A.C. winding 32 by the A.C. driver 34. Conversely, when a negative input signal is applied to the setting winding 28, an output voltage is induced in the output winding 40 by both phases of the A.C. current.

*Output signal as a function of the contour of the limiting material of the setting aperture*

Figure 5:
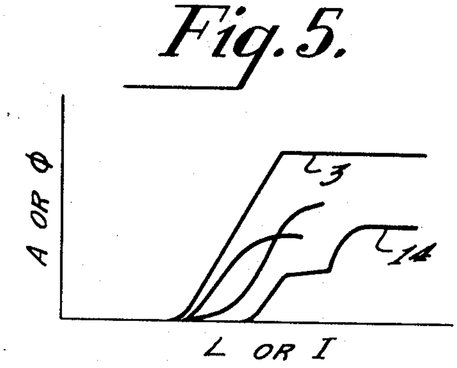
Fig. 5 is an exemplary diagram illustrating the change in output obtained by changing the contours of one of the apertures of a transfluxor.
Figure 6:
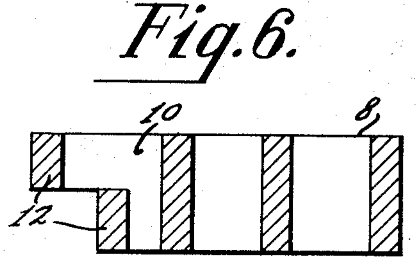
Fig. 6 is a modification of a transfluxor which provides an output characteristic having a step at a predetermined input current.

In Fig. 1, the setting or controlling signal is applied to a setting aperture whose limiting surface was characterized as being a conic section. The output signal obtained in response to a change in the amplitude of the setting signal was shown to vary in a linear fashion in the range between two extreme values of the amplitude of the setting signal. One value is that at which the setting signal just succeeds in reversing the flux flow in a finite area along the flux path having a minimum average length in the surface limiting the setting aperture. The other value is that which causes a flux reversal in all the limiting material, including that along the flux path having a maximum average length in the surface limiting the setting aperture. By providing the limiting surface of the setting aperture with various contours, different response characteristics to the driving A.C. current can be obtained. For example, the limiting surface of the setting aperture can be defined with reference to a straight line contained within that limiting surface, which line is parallel to the axis of the driven aperture 24. In the embodiments herein, the driven aperture is assumed to be a simple circular cylinder and the limiting surface can be defined with reference to the axis of the driven aperture 24. A series of planes (or a single translating plane) perpendicular to the driven aperture axis intersects the limiting surface of the setting aperture along contours. The specification of these contours determines the limiting surface. These planes also intersect the cylindrical surface of the driven aperture producing circles, as well as the outer surface of the material limiting the setting aperture. There is an average length flux path in the material limiting the setting aperture for every plane position. Also, for every plane position there is an area of material, assumed to be infinitesimally small, through which the flux passes. This small area is proportional to the width of the material at the outer limiting surface. The relation between the average length of the flux path and the width of the material determines the response characteristic of the transfluxor. In the case of the aperture 22 of Fig. 2, and transfluxors having two parallel apertures described hereinafter, the response characteristic is a straight line as indicated by the line 3 of Fig. 5. In Fig. 5 the response characteristic is qualitatively shown as a function of the average path length (or the magnetizing current required to produce a flux reversal along this path), and the area of the contour (or the amount of flux induced in a path of this length). For more complicated relations, the response characteristic can be made to have any desired shape. For example, the input aperture 10 of the transfluxor 8 of Fig. 6 is provided with a sharp step in the outer limiting surface 12. The response characteristic of the lower portion of the input aperture 10 is linear, as is the response characteristic of the upper portion. In the graph of Fig. 5, the overall response characteristic is shown by the line 14 which is comprised of the two linear response characteristics which are separated by a predetermined amount. The spacing between the two characteristics is proportional to the difference in the average path length of the two portions. The above explanation is somewhat idealized. Actually, the flux path may not be contained entirely in the parallel planes described. Nevertheless, the shape of the limiting surface of the input aperture in three dimensions still controls the response characteristic of the transfluxor.

The contour of the setting aperture may also be considered as a geometrical surface generated by one or more planar curves which revolve about axes in the respective planes of the generating curves until the generated surfaces intersect. The transition region between the surfaces generated by the planar curves is preferably gradual. The axes of revolution may be coincident and the planar curves may comprise straight lines. In the simple case of a single straight line generatrix, a part of the line intersects another curve in a planar surface which intersects the body of the material. For example, the planar curve may be a straight line which is revolved about an axis parallel to the reference line 1 of Fig. 2 to continuously intersect a second curve in the top surface of the material. When the second curve is a circle, the limiting material of the setting aperture defines a right cylinder. Also, the planar curve may be a straight line having one end fixed and having one part which intersects a fixed curve, for instance a circle, in the top surface of the material. The straight line generatrix is revolved about an axis passing through the fixed point to continuously intersect the circle. By suitably truncating the cone thus generated, the limiting surface of the setting aperture defines a conic section. The material limiting said setting aperture may define a surface of other suitable geometric shape different from that of the other apertures. Portions of the setting aperture may be perpendicular to the top surface of the plane, while other portions are not perpendicular.

*Modification including a different geometrical arrangement of a transfluxor*

Figures 7, 8, 9, 10:
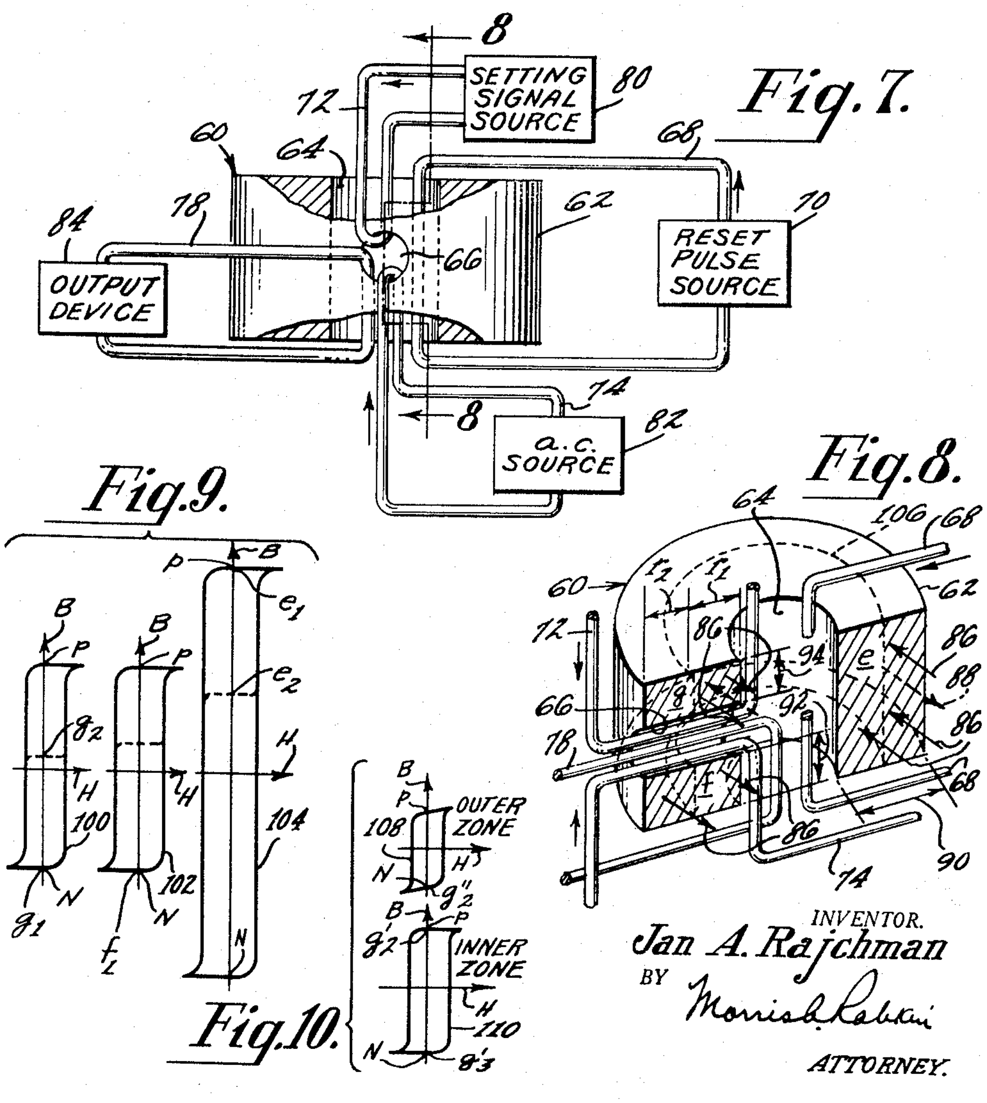
Fig. 7 is a schematic diagram of a magnetic system according to the invention, which employs a transfluxor having two apertures with axes located orthogonally to each other.
Fig. 8 is a cross-sectional view along the line 8—8 of the transfluxor of Fig. 7.
Fig. 9 is an idealized representation of the hysteresis loops relating to areas *e*, *f* and *g* of the transfluxor of Fig. 7.
Fig. 10 is an idealized representation of the hysteresis loops relating to the inner and outer zones of material encompassing one of the apertures of the transfluxors of Fig. 7.

Another arrangement of a transfluxor which can furnish a continuous range of output signals in response to varying values of setting signals may be one wherein the transfluxor is provided with but two apertures located orthogonally to each other. In Fig. 7, there is shown a magnetic system 60 having a transfluxor 62 shown in an elevational view. The transfluxor 62 is provided with a reset aperture 64 and a setting aperture 66. The setting aperture 66, in this embodiment, is also the driven aperture. The diameter of the reset aperture 64 is made substantially greater, for example, three times as great as the diameter of the setting aperture 66. The transfluxor 62 is fabricated in the form of a toroidal disk having the reset aperture 64 located axially along the center line of the disk, and the setting aperture 66 located at substantially a right-angle to the reset aperture 64 with the center lines substantially perpendicular. A reset winding 68 is threaded through the reset aperture 64 by means of passing the winding along the top surface of the disk 62, then through the aperture 64, and then along the bottom surface of the disk 62. Each terminal of the reset winding 68 is connected to a reset pulse source 70. A setting winding 72, an A.C. winding 74, and an output winding 78 are respectively threaded through the setting aperture 66. Each of the above-mentioned windings is brought along one side of the disk 62, then through the aperture 66, and then returned through the aperture 64. The setting winding 72 is connected to a setting signal source 80. The A.C. winding 74 is connected to an A.C. source 82. The output winding 78 is connected to an output device 84. Each of the above-mentioned sources and the output device may be the same as those previously described in connection with the system of Fig. 1.

*Operation of the system of Fig. 7*

The operation of the system of Fig. 7 is described in connection with the cross-sectional view along the line 8—8 thereof, which view is shown in Fig. 8. Assume that a relatively large, negative reset pulse is applied to the reset winding 68. The amplitude of this reset pulse is made sufficient to establish a saturating flux in the counterclockwise sense about the aperture 64 in all portions of the transfluxor 62, as indicated by the solid arrows 86. For convenience of description, the flux flow through a plane, for example the plane represented by the line 8—8, will be considered. This plane produces three distinct cross-sectional areas as follows: the area designated as *e* of a cross-sectional width 90, the area designated as *f* whose thickness 92 is equal to that of the material between the bottom of the aperture 66 and the bottom surface of the disk 62, and the area designated as *g* whose thickness 94 is equal to that of the material between the top of the aperture 66 and the top surface of the disk 62. The state of saturation at remanence of the three different areas, with reference to the path about aperture 66, are respectively represented in Fig. 9 by the points $e_1$, $f_1$ and $g_1$ of the respective curves 104, 102 and 100. Note that the areas *g* and *f* are saturated in opposite states of saturation at remanence with respect to a flux path encompassing the setting aperture 66. Also observe that the area *e* and each of the areas *g* and *f* are saturated at remanence in the same state with respect to a flux path about the reset aperture 64. Assume, now, that an A.C. signal is applied to the A.C. winding 74 by the A.C. source 82. The first, positive phase of the A.C. does not produce a flux reversal in the path about the setting aperture 66 because the area *g* is already saturated in the clockwise sense with reference to this path. Likewise, the following negative phase of the A.C. does not produce a flux reversal in the path about the aperture 66 because the area *f* is already saturated in the counterclockwise sense with reference to this path. The amplitude of both phases of the A.C. signal is made sufficient to produce the magnetomotive force required to cause a flux reversal in the path encompassing the setting aperture 66, but insufficient to produce the magnetomotive force required to cause a flux reversal in the longer path encompassing the reset aperture 64.

Let us consider, however, the effect on the flux path about the reset aperture 64 when a negative setting pulse of suitable amplitude is applied to the setting winding 74. A flux reversal is produced by this pulse in a portion of the longer path about the setting aperture 64. Because the magnetizing force is inversely proportional to the length of the flux path, the amplitude of the setting signal is chosen to be sufficient to reverse the sense of flux flow in at least a portion of the area *g* and the corresponding portion of the area *e* from the clockwise to the counterclockwise sense with reference to the path about the aperture 66. No flux reversal is produced in the area *f* because this already is saturated with flux in the counterclockwise sense with reference to the path about the setting aperture 66. Thus, the negative setting signal divides the area *g* of the disk 62 into two circumferential portions comprising an inner zone of radius $r_1$ and an ouer zone of radius $r_2$ ($r_2=R-r_1$ where R is the outer radius of the disk 62). The flux flow is reversed to the counterclockwise sense in the inner zone of radius $r_1$ as indicated by the dotted arrows 88, and remains in the clockwise sense in the outer zone of radius $r_2$ as indicated by the solid arrows 86, both senses being taken with reference to the path about the setting aperture 66. The hysteresis curves 108 and 110 of Fig. 10, respectively, represent the hysteresis curves for the outer zone and inner zone of the leg *g*. The state of saturation, upon the termination of the input signal, is represented by the point $g_2'$ for the inner zone and the point $g_2''$ for the outer zone. Note that the sense of flux flow, with respect to the path encompassing the setting aperture 66, in the inner zone of the area *g* and the corresponding portion of the area *f* is the same, while the senses of flux flow, with respect to the path about the setting aperture 66, in the outer zone of the area *g* and the corresponding portion of the area *f* are opposite. The state of saturation of the area *e*, with reference to the path about aperture 64, after the setting signal, is represented by the point $e_2$ on the curve 104 of Fig. 9.

Assume, now, that an A.C. current cycle is applied to the A.C. winding 74 by the A.C. source 82. The first positive phase of the A.C. current produces a flux reversal in the inner zone of the area *g* and the corresponding portion of the area *f* from the counterclockwise sense to the clockwise sense with reference to the setting aperture 66. The states of saturation at remanence with reference to the path about the setting aperture 66, following the positive phase of the A.C. signal, are represented by the point $g_3'$ on the curve 110 of Fig. 10, and the points $g_3$ and $f_3$ on the respective curves 100 and 102 of Fig. 9. The following negative phase of the A.C. current reverses the sense of flux flow in the inner zone back to the initial counterclockwise sense, and so on. Upon each change of flux in the inner zone, there is a corresponding voltage induced in the output winding 78 which links the path about the driven aperture 66.

The area included in the inner zone of the leg *g* and, consequently, the amount of output-voltage inducing flux is a function of the amplitude of the setting signal which is applied to the setting winding 72. Just as in the system of Fig. 1, a new setting signal, which is of a larger amplitude than the prior setting signal, increases the size of the inner zone of the leg *g*, and there is a proportional increase in the output voltage produced when the A.C. signal is applied to the A.C. winding 74. If the amplitude of the new input signal is equal to or less than that of the prior input signal, the amount of output voltage induced in the output winding 78 is unchanged. However, the transfluxor can be made responsive to each input signal, including those having a lesser amplitude, by applying a negative rseet pulse to the reset winding 68 at some time subsequent to each setting signal. Thus, after each reset signal, the senses of flux in the areas *g* and *f*, with reference to the setting aperture 66, are opposite.

*Modified operation of two-apertured transfluxors*

The method of operation of the transfluxor having two apertures whose axes are parallel to each other can be extended. In the magnetic system 112 of Fig. 11, the transfluxor 114 is molded in the form of a circular-shaped disk having a relatively large diameter, setting aperture 116 and a relative small diameter, driven aperture 118. The apertures 116 and 118 are located parallel to one another with their respective center lines perpendicular to a center line of the disk 114. The cross-sectional area of the narrow leg *j*, which is located between the periphery of the disk and the inside surface of the aperture 118, is made equal to the cross-sectional area of the other narrow leg *k* which is located between the inside surface of the driven aperture 118 and the inside surface of the setting aperture 116. The cross-sectional area of the wide leg *l*, which is located between the inside surface of the setting aperture 116 and the periphery of the disk 114, is made equal to or greater than the sum of the areas included in the narrow legs *j* and *k*. The cross-sectional areas of the legs *j*, *k* and *l* are taken at the most restricted portion of the material which, conveniently, may be along the center line of the disk 114. A setting winding 120 is threaded through the setting aperture 116 by means of passing the winding 120 along the top surface of the disk 114, then through the aperture 116 and then along the bottom surface of the disk 114. Both terminals of the setting winding 120 are connected to a setting pulse source 121. A reset winding 122, an A.C. winding 124, and an output winding 126, are, respectively, threaded through the smaller aperture 118 in the manner similar to that described for the setting winding 120. Both terminals of the reset winding 122 are connected to a reset pulse source 123. Both terminals of the A.C. winding 124 are connected to an A.C. source 125. Both terminals of the output winding 126 are connected to an output device 127. Each of the above-mentioned sources may by any suitable device capable of furnishing the required current signals. The output device can be any suitable device for utilizing the output voltage induced in the output winding 74.

Figure 12:
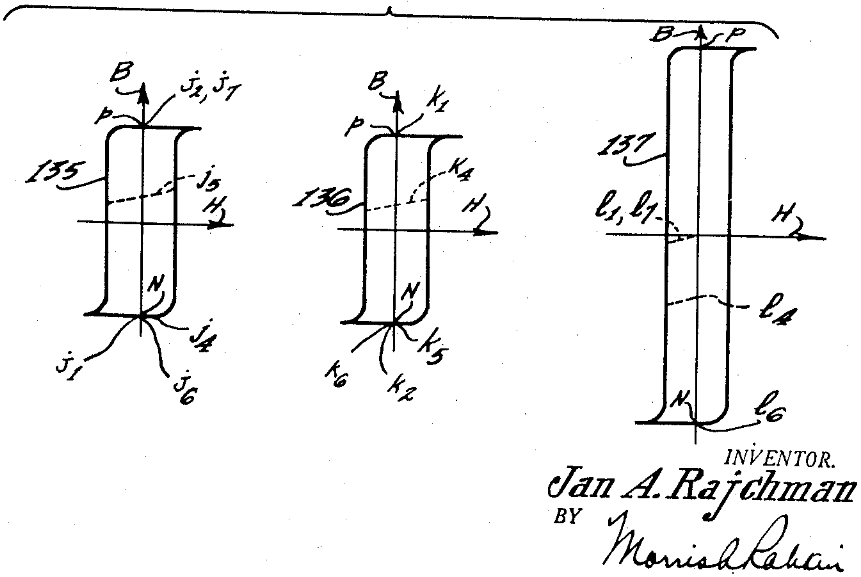
Fig. 12 is an idealized representation of the hysteresis loops relating to the legs *j*, *k* and *l* of the transfluxor of Fig. 11.

In the first mode of operation of the transfluxor 114, assume that a negative reset signal is applied to the reset winding 122 by the source 123. This current pulse is limited in amplitude so as to produce a saturating counterclockwise flux flow only in the relatively short path 128 about the driven aperture 118. No flux flow is produced by the reset pulse in the longer flux path which encompasses both the apertures 118 and 116. The state of saturation at remanence, with reference to the flux path about the setting aperture 116 of each of the legs *j* and *k*, is represented by the points $j_1$ and $k_1$ on their respective hysteresis curves 135 and 136 of Fig. 12. If, now, an A.C. current cycle is applied to the A.C. winding 124 by the source 125, the flux in the path about the aperture 118 alternatingly reverses from the counterclockwise to the clockwise sense, and so on, in response to the alternating positive and negative phases of the A.C. current. The state of saturation at remanence of the leg *j* and the leg *k*, with reference to the path about the setting aperture 116, upon the termination of the first phase of the A.C. current, is represented by the points $j_2$ and $k_2$ on their respective curves 135 and 136 of Fig. 12. The states of saturation change back and forth between those represented by the points $j_1$ and $j_2$ for the leg *j* and between those represented by the points $k_1$ and $k_2$ for the leg *k* for each succeeding positive and negative phase of the A.C. current. This response condition in which there is a flux reversal in all portions of the legs *j* and *k* corresponds to the "full-on" condition of the transfluxor.

The transfluxor 114 can be arranged to provide an output signal which is a function of the amplitude of a signal applied to the setting winding 120. For example, assume that a negative setting pulse is applied to the setting winding 120 by the source 121. The amplitude of the setting pulse is made sufficient to produce a flux flow only about the aperture 116 in all the circumferential area out to a radial distance $r_3$ from the center of the setting aperture 116. That is, the magnetomotive force $$H_3=\frac{ni}{2\pi r_3}$$

is equal to or greater than the coercive force of the material out to the radial distance $r_3$. At radial distances greater than $r_3$, the magnetizing force is less than the required coercive force. Accordingly, the leg *k* is effectively divided into two zones by the setting pulse, one zone being an outer zone of a cross-sectional width equal to the distance $r_3—r_s$ (where $r_s$ is the radius of the setting aperture), and the other zone being an inner zone of a cross-sectional width equal to the distance $r_4—r_3$ (where $r_4$ is the distance between the center of the setting aperture 116 and the inner surface of the driven aperture 118 along the center line of the disk). Thus, the setting pulse establishes a clockwise flux with reference to the path about the driven aperture 118 in the outer zone of the leg *k* and leaves the counterclockwise flux in the inner zone of the leg *k* unchanged. The state of saturation at remanence of the legs *k* and *l*, upon the termination of the setting pulse, is represented by the points $k_4$ and $l_4$ on the respective hysteresis curves 136 and 137 of Fig. 12. The state of saturation at remanence of the leg *j* is represented by the point $j_4$ which is the same as the point $j_1$.

Assume, now, that an A.C. current cycle is applied to the A.C. winding 124 by the source 125. The first phase of the A.C. current reverses the flux in the inner zone of the leg *k* and the flux in a corresponding inner zone of the leg *j* from the counterclockwise sense to the clockwise sense, and the following phase of the A.C. current reverses the flux in these inner zones back to the initial counterclockwise sense. Note that the flux in the outer zone of the leg *k* is unaffected by either of the phases of the A.C. current because the outer zone of the leg *k* already is saturated with flux in the clockwise sense with reference to the path about aperture 118, thus blocking a flux change in this sense. The outer zone of the leg *j* already is saturated with flux in the counterclockwise sense, with reference to the path about the aperture 118, thereby blocking a flux increase in this sense. Consequently, either one or the other of the outer zones of the legs *k* and *j* is already saturated with flux in the sense in which the A.C. tends to increase the flux. The state of saturation at remanence of each of the legs *j* and *k*, upon the termination of a positive phase of the A.C. current, is shown by the points $j_5$ and $k_5$ on their respective hysteresis curves 135 and 136 of Fig. 12. Note that there is only a partial change of flux corresponding to the flux reversal in the inner zone of the leg *k* and the corresponding portion of the leg *j*. Observe that, after each positive phase of the A.C. current, the entire leg *k* has flux in the clockwise sense with reference to the path about the driven aperture 118. However, the two zones are preserved in the leg *j* and are restored in the leg *k* upon the termination of a complete cycle of the A.C. current.

The relative cross-sectional widths of the inner and outer zones of the leg *k* can be altered by varying the amplitude of the setting current. For example, the transfluxor 114 can be placed in a "fully-off" condition by applying a relatively intense, negative pulse to the setting winding 120. This intense setting pulse establishes a counterclockwise flux with reference to the path about the setting aperture 116 in all portions of the leg *k*. Thus, the legs *j* and *k* are saturated in opposite states with reference to the flux path about the driven aperture 118. In the "fully-off" condition, the states of saturation at remanence with reference to the path about the driven aperture 118 are represented by the points $j_6$ and $k_6$ on the respective hysteresis curves 135 and 136 of Fig. 12. The point $j_6$ is the same as the initial point $j_1$. The point $l_6$ of the curve 137 represents the state of saturation of the leg *l*. In the "fully-off" condition, no flux reversal occurs in any portion of the legs *j* and *k* in response to either phase of the A.C. current because one or the other of the legs *j* and *k* blocks a flux increase.

The transfluxor 114 can be reset to its initial condition by first applying a relatively intense, positive reset pulse to the reset winding 122. This reset pulse establishes a clockwise flux flow in the longer path encompassing both the driven aperture 118 and the setting aperture 116, thereby reversing the flux flow in the legs *j* and *l* from the counterclockwise sense to the clockwise sense with reference to this longer path. No flux reversal occurs in the leg *k* because this leg is already saturated with flux in the clockwise sense with reference to the path about the driven aperture 118. The states of saturation at remanence of each of the legs *j* and *l* are represented by the points $j_7$ and $l_7$ on the respective curves 135 and 137 of Fig. 12. Note that the intense reset pulse causes both the leg *j* and the leg *k* to be saturated at remanence in the same state with reference to the path about the driven aperture 118 with a saturating flux in the clockwise sense. If, now, a negative reset pulse of reduced amplitude is applied to the reset winding 122, the flux in the legs *j* and *k* reverses to the initial counterclockwise sense with reference to the path about the driven aperture and the transfluxor 114 is returned to the "fully-on" condition. This schedule of reset pulses also can be used to establish the "fully-on" condition after each setting signal or after any combination of setting signals.

Therefore, the arrangement of the transfluxor 114 provides one means for continuously varying the response of the transfluxor 114 between the "fully-off" and the "fully-on" conditions in dependence upon the amplitude of a setting pulse which is applied to the setting winding 120. Upon each reversal of the flux in the path about the driven aperture, an output voltage is induced in the output winding 126.

*Other modes of operation of a two-aperture transfluxor*

Figures 13, 14, 15:
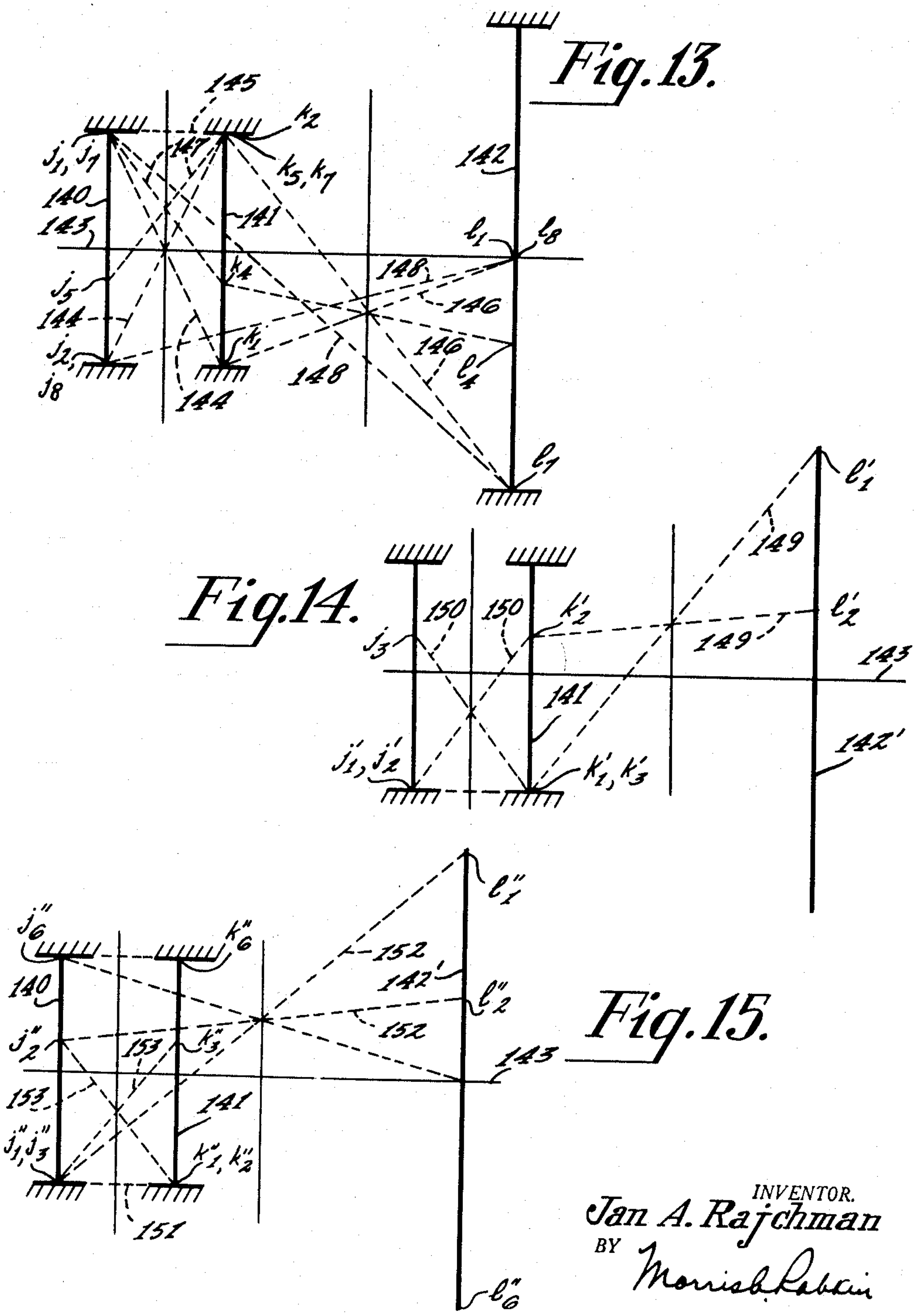
Fig. 13 is a schematic diagram which may be used to represent the operation of a two-apertured transfluxor according to the invention, which adopts a convention for showing the flux flow in the various legs of the transfluxor for one method of operation thereof.
Fig. 14 is a schematic diagram using the convention adopted in Fig. 13 and illustrating a different method of operating a two-apertured transfluxor.
Fig. 15 is a schematic diagram using the convention of Fig. 13 and illustrating still another method of operating a two-apertured transfluxor.

A convention is adopted herein, in Fig. 13, for representing a two-apertured transfluxor. This convention can be used, conveniently, to described other of its modes of operation. In the symbolic diagram of Fig. 13, a vertical line 140 is used to represent the variation of the saturation at remanence in a narrow leg *j* of a two-apertured transfluxor, such as in the transfluxor 114 of Fig. 9. The vertical line 141 is used to represent the variation of the saturation at remanence in a second narrow leg *k*, and the vertical line 142 is used to represent the variation of the saturation at remanence in the third wide leg *l*.

Figure 11:
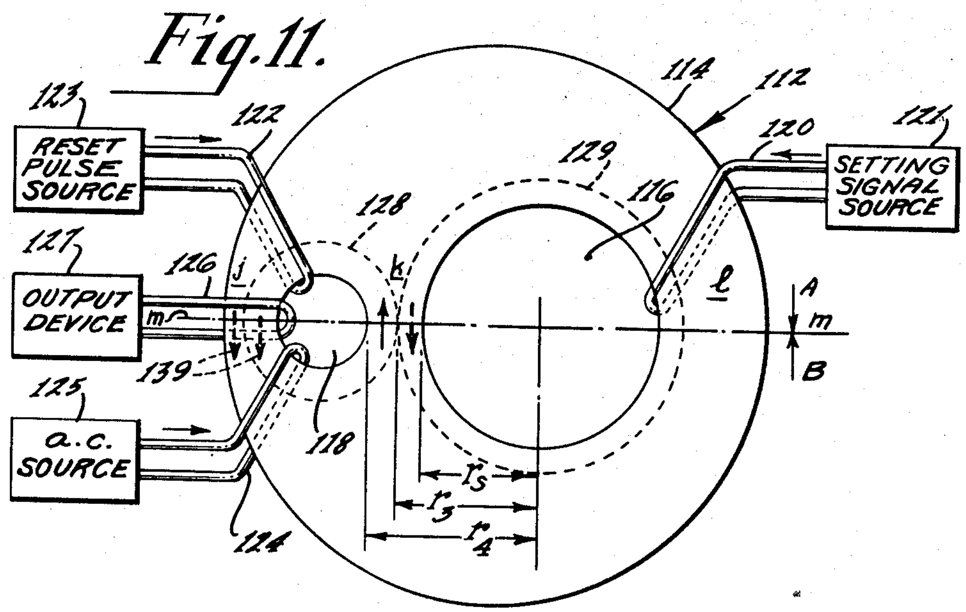
Fig. 11 is a schematic diagram of a magnetic system according to the invention, which employs a transfluxor having two apertures with axes located parallel to one another.

In this convention, it is more convenient to consider the direction of flux flow through a surface which intersects one or all of the apertures such, for example, as the plane represented by the dash line *m*—*m* of Fig. 11. Accordingly, the direction of flux flow at any point of the surface is defined as along a normal to the surface from one side A of the surface to the other side B of the surface, or vice versa. One of these two directions is selected as the positive direction, and the other of the two directions is the negative direction. In the present convention, and hereinafter, the intersecting surface is chosen to be a horizontal plane cutting the apertures. The positive direction of flux flow is then taken as being in an upward direction, and the negative direction is taken as downward. Note that the direction of flux flow in the respective legs *j*, *k* and *l* is taken as positive or negative without reference to a closed flux path, but with reference to the intersecting surface mentioned above. Only the ordinate of the hysteresis curve representing the magnetic characteristics of the material is used because the material is assumed to be saturated at remanence along all points of the magnetic induction axis. That is, each curve of a family of hysteresis curves, derived from various values of magnetizing force, exhibits a substantially rectangular shape similar to the shape of the major curve. Each of the legs may be fully saturated at remanence with flux in either of two states corresponding to flux in either the positive or the negative direction. These last-mentioned two states of saturation at remanence are represented by fixed points at the termini of each of the vertical lines representing a leg. The upper terminus of a verical line is used to represent the state *p* corresponding to a flux flow in the positive direction. The lower terminus of a vertical line is used to represent the opposite state N corresponding to a flux flow in the negative direction.

The horizontal line 143 intersecting the centers of each of the lines 140, 141 and 142 represents the zero flux condition in the respective legs. The distance between two legs along the horizontal line 143 is proportional to the physical spacing between the centers of the legs *j*, *k* and *l*. As an illustration of the use of the symbolical diagram of Fig. 13, the operation of the transfluxor of Fig. 11 is as follows:

Assume that a positive reset pulse is applied to the reset winding 122 in the direction of the arrow. Upon the termination of this pulse, the leg *j* is saturated at remanence in the state P corresponding to a positive direction of flux flow, and the leg *k* is saturated at remanence in the state N corresponding to a negative direction of flux flow. The state of saturation at remanence of the legs *j* and *k* are represented by the points $j_1$ and $k_1$ on the respective vertical lines 140 and 141. The state of saturation of the leg *l* is represented by the point $l_1$ and corresponds to a zero flux therein. Thus, the flux continuity condition through the intersecting surface is conserved because the algebraic sum of the flux in each of the legs is equal to zero. Assume, now, that a cycle of A.C. current is applied to the A.C. winding 124. The first negative phase causes a flux reversal in the legs *j* and *k* reversing the flux in the leg *j* to the negative direction and reversing the flux in the leg *k* to the positive direction. This flux reversal or interchange can be represented on the symbolical diagram by pivoting the line 144 which joins the points $j_1$ and $k_1$ about its center point to reach the points $j_2$ and $k_2$. The latter two points represent the state of saturation at remanence of the legs *j* and *k* on the termination of the first phase of the A.C. current. The next positive phase of the A.C. current reverses the flux flow in each of the legs *j* and *k* back to the initial sense, and the line 144 is pivoted about its center back to the points $j_1$ and $k_1$. Thus, as the A.C. current is passed through the driven aperture the flux reversals in the legs *j* and *k* are represented by the rotations of the line 144 back and forth about its pivot point. Upon each interchange of flux in the legs *j* and *k*, an output voltage is induced in the output winding which links the path about the driven aperture.

Assume, now, that a positive setting pulse is passed through the setting aperture, the amplitude of this setting pulse being less than that required to produce the "fully-off" condition. This setting pulse produces an interchange of flux between the legs *k* and *l* only, because its intensity is insufficient to alter the flux condition in the leg *j*. Because of the requirement of flux continuity, any decrease of flux in the leg *j* must be compensated for by an increase of flux in the leg *l*, and vice versa. The effect of the setting pulse on the legs *k* and *l* is represented in Fig. 13 by pivoting the line 146 which connects the points $k_1$ and $l_1$ on the respective lines 141 and 142 about its center to reach the respective points $k_4$ and $l_4$. The point $k_4$ represents the flux change in the leg *k*, from the state represented by the point $k_1$ to the state represented by the point $k_4$, as the result of the setting pulse. Likewise, the point $l_4$ represents the flux change in the leg *l*, from the state represented by the point $l_1$ to the state represented by the point $l_4$, as a result of the setting pulse. If, now, the A.C. current is passed through the driven aperture, it again produces a flux interchange between the legs *j* and *k*. This interchange is represented by pivoting the line 147 which joins the points $j_1$ and $k_4$ about its center. Following each negative phase of the A.C. current, there is a flux reversal in the inner zones of the legs *j* and *k*. This flux reversal is represented by the points $j_5$ and $k_5$ on the respective lines 140 and 141. Following each positive phase of the A.C. current, the line 147 is again pivoted about its center to reach the points $j_1$ and $k_4$ which represent the initial flux conditions in these legs.

Assume, now, that a positive setting current of a larger amplitude is passed through the setting aperture. This setting pulse produces a saturation flux in the positive direction in the leg *k* as represented by the point $k_7$ on the line 141. The latter setting current produces a saturating flux in the negative direction in the leg *l* as represented by the point $l_7$ on the line 142. The points $k_7$ and $l_7$ are reached by rotating the line 146 about its center. It is apparent that the line 145 joining the points $j_1$ and $k_7$ cannot be pivoted about its center because both ends of the line 145 are connected to fixed points. This condition then represents the "fully-off" or blocked condition.

The transfluxor is reset by passing an intense, negative current through the driven aperture to produce a flux interchange between the legs *j* and *l*. This intense current pulse produces a saturating flux in the negative direction in the leg *j* and brings the flux in the leg *l* to a value close to zero. The states of saturation are represented by the points $j_8$ and $l_8$ on the respective lines 140 and 142. The points $j_8$ and $l_8$ are reached by rotating the line 148 joining the points $j_1$ and $l_7$ about its center. The initial flux condition is then reestablished by passing a smaller amplitude positive current through the driven aperture to cause a flux interchange between the legs *j* and *k*. The states of saturation following this smaller pulse are represented by the points $j_1$ and $k_1$ on the line 140 and the line 141 respectively. The latter points are reached by rotating the line 144 joining the points $j_8$ and $k_7$ about its center.

Thus, the symbolical diagram of Fig. 13 illustrates one mode of operating the transfluxor 114 of Fig. 11 to obtain a continuous range of response conditions, between the "fully-on" and "fully-off" conditions, to various amplitude setting currents.

A different operation of a two-apertured transfluxor is illustrated in the symbolical diagram of Fig. 14 which utilizes the adopted convention.

Note that the ends of the line 142', which represent the flux conditions of the leg $l$, are not terminated in a fixed point as was the case in the prior modes. The variable length of the line 142' indicates that the cross-sectional area of the leg $l$ may be greater than the sum of the cross-sectional areas of the legs $j$ and $k$. In such case, the legs $j$ and $k$ are fully saturated at remanence even though the leg $l$ may not be fully saturated itself. However, the cross-sectional area of the leg $l$ must be sufficiently large to accommodate the flux changes in the legs $j$ and $k$ as required by the flux continuity relation. In practice, the cross-sectional area of the leg $l$ will be made sufficiently large to insure that when the transfluxor is placed in its blocked condition, by saturating the legs $j$ and $k$ with flux in the same direction, the leg $l$ will have sufficient area to accommodate more than the sum total of the saturating fluxes in the legs $j$ and $k$. Initially, the transfluxor is reset by a large amplitude, negative current which is passed through the setting aperture; i.e., this pulse may be applied to the setting winding or to the separate reset winding which is threaded through the setting aperture. Upon the termination of this current, there is a saturating flux in the negative direction established in the legs $j$ and $k$, as represented by the points $j_1'$ and $k_1'$ on the lines 140 and 141, and a saturating flux in the positive direction is established in the leg $l$ as represented by the point $l_1'$ on the line 142'. Thus, this negative reset pulse produces a blocked condition because the line which joins the points $j_1'$ and $k_1'$ cannot pivot about its center. Assume, now, that a setting pulse of a smaller amplitude is passed through the setting aperture, for example, by means of the setting winding. The intensity of this positive pulse is made sufficient to cause a flux interchange only between the legs $k$ and $l$. The states of saturation of the legs $k$ and $l$ are now as represented by the points $k_2'$ and $l_2'$ on the respective lines 141 and 142'. The points $k_2'$ and $l_2'$ are reached by pivoting the line 149 which connects the points $k_1'$ and $l_1'$ about its center to reach the points $k_2'$ and $l_2'$. The transfluxor is now in an open condition to the extent that the line 150 which joins the points $j_1'$ and $k_2'$ can rotate about its center.

For example, assume that an A.C. current is passed through the driven aperture; the first phase of the A.C. current causes an interchange of flux between the legs $j$ and $k$, as represented by the points $j_3'$ and $k_3'$ which are reached by pivoting the line 150 about its center. The following phase of the A.C. current then reverses this flux back to the initial state, as represented by the initial points $j_1'$ and $k_2'$ which are reached by again pivoting the line 150 about its center. Thus, in this mode of operation, the amount of flux which is interchanged between the legs $j$ and $k$ in an "on" condition is determined by the amplitude of the setting current which is passed through the setting aperture. The "off" or reset condition can be produced once again by passing a relatively intense, negative reset current through the setting aperture.

Still another mode of operating a transfluxor is illustrated by the symbolical diagram of Fig. 15. In this mode, the transfluxor is reset by passing a negative reset current, of a relatively large amplitude, through the setting aperture to produce the flux conditions represented by the points $j_1''$, $k_1''$ and $l_1''$ on the respective lines 140, 141 and 142'. The transfluxor is then set by passing a positive current pulse through the driven aperture. The flux interchange between the legs $j$ and $k$ is blocked because the line 151 joining the points $j_1''$ and $k_1''$ cannot rotate about its center. However, assume that a positive setting current of a sufficient amplitude to produce a flux interchange between the legs $j$ and $l$ is passed through the driven aperture. The state of saturation of the legs $j$ and $l$ is indicated by the points $j_2''$ and $l_2''$ which are reached by pivoting the line 152, which joins the points $j_1''$ and $l_1''$, about its center to reach the points $j_2''$ and $l_2''$. No flux change occurs in the leg $k$ because this leg is already saturated with flux in the negative direction. Now, a flux interchange is possible between the legs $j$ and $k$. For example, a line 153 joining the points $j_2''$ and $k_1''$ can be rotated back and forth about its center between the points $k_1''$, $j_2''$ and $k_3''$, $j_3''$ by passing an A.C. current through the driven aperture. In this mode of operation, the setting current is larger than the setting current required in the prior modes of operation because the amplitude of the setting current must be sufficient to cause a flux flow in the longer path encompassing both the driven and the setting apertures.

The arrangement of the transfluxor of Fig. 15 is advantageous in the case where it is desired to provide a relatively large amount of load current in an output winding linking the driven aperture. In such case, the A.C. current passed through the driven aperture may comprise a first positive phase which generates a relatively intense magnetizing force of one polarity followed by a second negative phase which generates a relatively weak magnetizing force of the opposite polarity. The transfluxor is set by passing a relatively large amplitude, negative current through the setting aperture to produce the flux conditions represented by the points $j_1''$, $k_1''$, and $l_1''$ on the respective lines 140, 141, and 142'. The first, positive phase of the A.C. is sufficient to produce a magnetizing force along the longer path encompassing both the driven aperture and the setting aperture and causes a flux interchange between the legs $j$ and $l$. For example, the new state of saturation of the legs $j$ and $l$ may be that represented in the points $j_2''$ and $l_2''$ which points are obtained by rotating the line 152 about its center. The following, small amplitude, negative phase of the A.C. has a value less than that required to generate the magnetizing force necessary to produce a flux change along the longer path encompassing both apertures. However, the negative phase has sufficient amplitude to cause a flux interchange between the legs $j$ and $k$. Now, the state of saturation of the legs $j$ and $k$ is represented by the respective points $j_3''$ and $k_3''$ which points are obtained by rotating the line 152 about its center.

The next succeeding and the remainder of the positive phases of the A.C. during this setting produce flux interchanges between the legs $j$ and $k$ only. The flux in the leg $l$ remains unchanged because the flux continuity condition is entirely satisfied by the flux interchange between the legs $j$ and $k$. In the system of Fig. 15, the intensity of the magnetizing force produced by the positive phase varies inversely with the distance from the driven aperture. Consequently, all the flux change in the leg $j$ is matched by the equal and opposite flux change in the near leg $k$ before the magnetizing force produced by the positive phase grows to a value sufficient to produce a flux change in the distant leg $l$. The amount of flux change in the leg $j$ is that represented by the difference between the points $j_3''$ and $j_2''$. The equal amount of flux change in the leg $k$ is that represented by the difference between the points $k_3''$ and $k_2''$. During the relatively intense, positive phase, a relatively large output current is induced in the output winding. The following, negative phase serves to reverse the flux in the legs $j$ and $k$ and to supply the demagnetizing load current. The output winding can conveniently link the material common to the driven and to the setting apertures as described in the aforementioned application, Serial No. 455,725.

The transfluxor can be placed in its blocked condition by applying a relatively intense, positive reset current through the setting aperture. This positive, reset current is of sufficient amplitude to produce a flux change in the longer path encompassing both the apertures as well as in the shorter path encompassing the setting aperture. The state of saturation of the legs *j*, *k*, and *l* in the reset condition is represented by the respective points $j_6''$, $k_6''$, and $l_6''$. Now, the transfluxor is blocked for either phase of the A.C. current. The first, positive phase passed through the driven aperture does not produce a flux reversal because the legs *j* and *k* are saturated with flux in the same direction and the leg *l* is substantially saturated with flux in the negative direction. Similarly, the negative phase does not produce a flux reversal because it is of insufficient intensity to cause a flux change along the longer path.

By regulating the intensity of the first, positive reset current, the amount of flux interchanged between the legs *j* and *k* can be made to have any value between the blocked condition, when no flux interchange is produced, and the "full-on" condition, when all the flux in the legs *j* and *k* is interchanged. Again, the leg *j* can be considered to be divided into two different zones, with flux in the opposite senses, with respect to the path about the driven aperture in the two zones.

*Output load connections for transfluxors*

Figure 16:
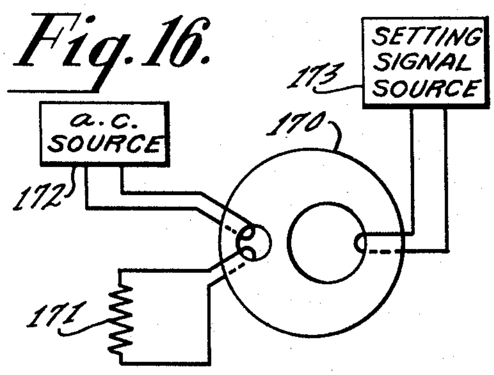
Figs. 16, 17, 18, 19, 20 and 21 are schematic diagrams showing various ways of connecting a transfluxor in a load circuit.

In the prior description, it was convenient to describe the various transfluxors as being arranged in parallel between the A.C. source and the output load device with a one-to-one turn ratio between the A.C. winding and the output winding. The transfluxor, however, can be used advantageously as a magnetic element whose impedance can be set by a pulse to any desired impedance level of a range of impedance levels, or whose coupling between the source and the load can be varied over a continuous range by applying suitable setting pulses. That is, the transfluxor is placed in one of its response conditions by a setting signal and thereafter transmits a finite integrated output voltage until it is reset to its blocked condition. A simple diagram of a transfluxor employed as a variable coupling element is shown in Fig. 16 in which the transfluxor 170 is set to furnish a predetermined output to a load device, illustrated as a resistor 171. The A.C. input signal is supplied by the A.C. source 172. The level of the output voltage is controlled by the amplitude of a setting signal furnished by a setting signal source 173. Note that the control is continuous as the transfluxor "remembers" the response condition to which it is set for an indefinitely long time. No holding power is required.

Figure 17:
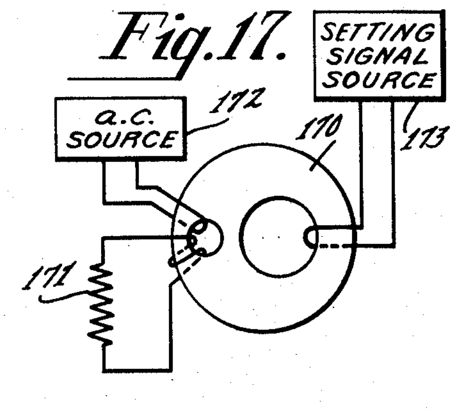
Figure 18:
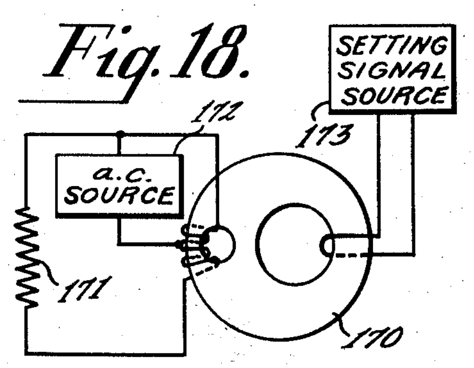

The system of Fig. 17 is similar to that of Fig. 16 except that a current step-up is obtained by linking a plurality of turns of an output winding to the path about the driven aperture of the transfluxor. The turn ratio between the A.C., or primary, winding and the output, or secondary, winding can be of any desired value and current step-up or current step-down may be obtained. In case a high-turn ratio is desired between the primary and secondary windings, an autotransformer connection between the primary and secondary windings may be employed, as illustrated in Fig. 18.

Figure 19:
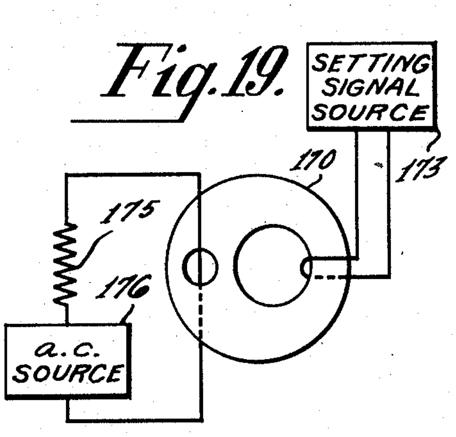

The prior magnetic-core devices are generally characterized by two different impedance levels, zero and infinity, corresponding to the one or the other of their states of saturation. A transfluxor, however, when employed as a variable impedance device, has a continuous range of impedance levels. For example, Fig. 19 illustrates a transfluxor 170 connected in series with a load 175. A constant source of A.C. voltage 176 is connected across the load 175 and the series-connected transfluxor 170. The A.C. winding is coupled to the path about the driven aperture. The impedance of the transfluxor is varied by means of a setting signal which is furnished by the setting signal source 173. Thus, when a relatively intense setting pulse of one polarity is passed through the setting aperture, the transfluxor 170 is placed in its "full-off" condition. Now, when the A.C. voltage is applied across the series-connected circuit, there is substantially no flux change produced in the transfluxor 170, and, consequently, there is very little voltage drop across the transfluxor. Practically the entire A.C. voltage appears across the load 175. By passing another setting pulse of the opposite polarity and suitable amplitude through the setting aperture, the transfluxor is placed in the "full-on" condition and large changes of flux are produced in the transfluxor 170 when a voltage is applied to the series-connected circuit. In this condition, practically all the A.C. voltage appears across the transfluxor and substantially no voltage appears across the load. The voltage drop across the load 175 can be varied to have any value between these two extremes by suitably actuating the setting device 173 to furnish proper amplitude setting pulses. The operation of the transfluxor may, for example, be similar to that just explained in connection with Fig. 15. Note, however, in so far as the load 175 of Fig. 19 is concerned, the A.C. voltage is blocked when the transfluxor is placed in its "full-on" condition, and the A.C. voltage is transmitted when the transfluxor is placed in its "full-off" condition. This series-connection is advantageous in applications in which a number of transfluxors are driven in parallel from a single A.C. voltage source. The response condition of each of the paralleled transfluxors is controlled by a different one of a plurality of setting devices. Also note that in the series-connection of Fig. 19, there need be but a single A.C. winding threaded through the driven aperture. Thus, a plurality of paralleled transfluxors could be conveniently stacked coaxially and the A.C. winding could be comprised of a short, stiff piece of wire which is threaded through the driven aperture of each of the transfluxors. This series arrangement is also advantageous in situations in which the current-voltage characteristic of the load is nonlinear, as, for example, an incandescent lamp, because the voltage drop across the transfluxor, for any given setting, is substantially constant.

Figure 20:
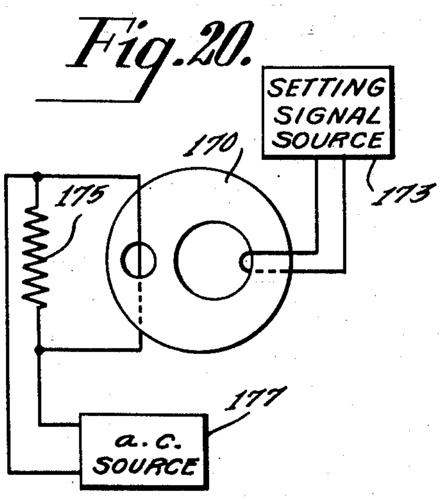
Figure 21:
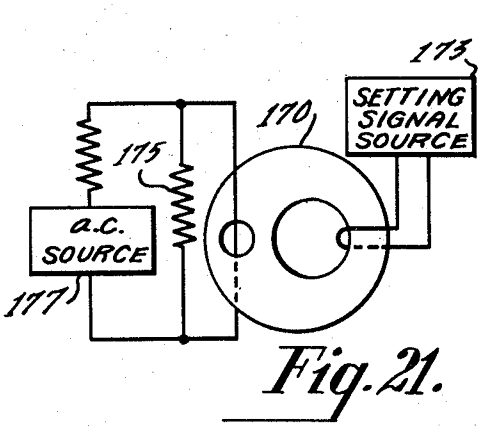

Fig. 20 illustrates a simple circuit in which a transfluxor 170 is connected in shunt with a load 175. The A.C. source 177 is connected to the parallel circuit comprising the load 175 and the transfluxor 170. It will be appreciated that the current flow in the load 175 can be varied at will by applying a suitable setting signal to the transfluxor 170. For example, when the transfluxor is placed in its "full-on" condition, a minimum current flows in the load 175 and, when the transfluxor is placed in its "full-off" condition, a maximum current flows in the load 175. Fig. 21 illustrates still another connection of a transfluxor in series-parallel fashion to the A.C. source 177. It will be apparent to those skilled in the art that the transfluxor load connections illustrated in Figs. 16 through 21 are exemplary only and more complicated arrangements are possible.

*Transfluxor with improved output voltage characteristic*

In the arrangements of the transfluxor devices, it is advantageous to maintain the diameter of the driven aperture as small as possible in order that the transfluxor can be operated by an A.C. signal which has a minimum current amplitude. That is, the magnetizing current required to generate a flux reversal in the path about the driven aperture is proportional to the diameter of the driven aperture. An additional advantage in providing a driven aperture having a minimum diameter is that it is desirable to have a large ratio between the length of the path encompassing the driven aperture only and the path encompassing both apertures. A large value of this ratio permits a larger variation in the amplitude of the A.C. driving current before a flux change is produced in the side leg. The net load current is equal to the difference between the applied current and the magnetizing current. Thus, by making the diameter of the driven aperture a minimum size, the magnetizing current is minimized and the possible range of the applied A.C. current, and consequently the range of useful load current, is enlarged.

In practice, the number of turns of the output winding which can be linked to the path about the driven aperture is limited by the physical size of the driven aperture. A very small diameter of the driven aperture limits the amount of output voltage, or the maximum impedance which can be obtained. The effective impedance of a transfluxor of the type having two parallel apertures can be increased, without increasing the required magnetizing current, by increasing the (height) thickness of the transfluxor and thereby increasing its volume.

Figure 22:
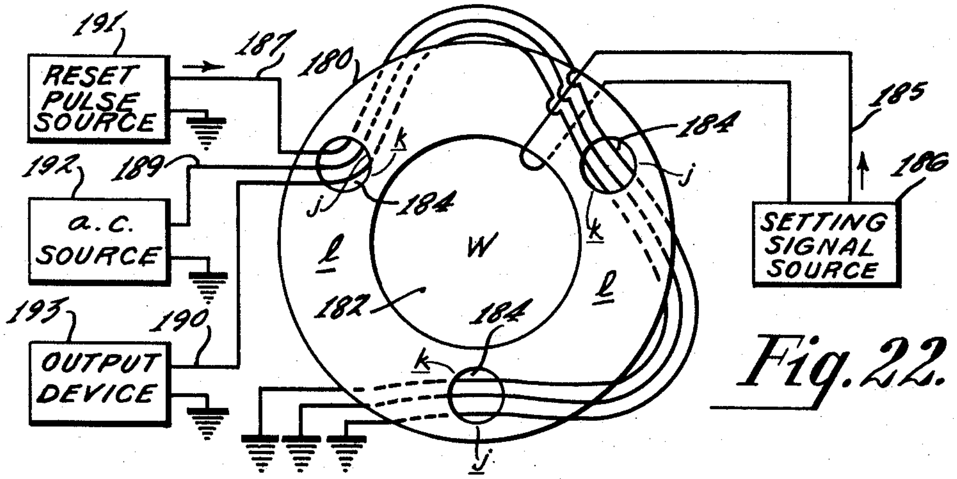
Fig. 22 is a schematic diagram of a magnetic system according to the invention, which employs a transfluxor having a setting aperture and a plurality of output apertures with axes located parallel to the axis of the setting aperture.

One advantageous method of increasing the effective impedance or voltage output is by providing a plurality of smaller apertures which are arranged at spaced intervals about the larger aperture. For example, in Fig. 22, a transfluxor 180 is provided with a large-diameter, setting aperture 182 and three different smaller-diameter, driven apertures 184. The driven apertures 184 are spaced at 120-degree intervals about the circumference of the disk 180. A setting winding 185 is threaded through the setting aperture 182. Both terminals of the setting winding 185 are connected to a setting signal source 186. A reset winding 187, an output winding 188, an A.C. winding 189, and an output winding 190 are each threaded through each of the smaller apertures. Each of these three windings is threaded in series-aiding relation through the three individual apertures 184. By way of example, the reset winding 187 is brought along the top surface of the transfluxor 180, then through a first of the apertures 184, then along the bottom surface, then around the edge of the transfluxor and up through another of the apertures 184, and so on. Each terminal of the reset winding 187 is connected to a reset pulse source 191. Each terminal of the A.C. winding 189 is connected to an A.C. source 192, and each terminal of the output winding 190 is connected to an output device 193. The portions of material adjacent each of the apertures are legs. These legs are designated *j, k,* and *l* in correspondence to the three legs of the transfluxor 114 of Fig. 11. Each combination of a driven aperture 184 and the setting aperture 182 is operated the same as an individual two-apertured transfluxor. Thus, the sense of flux flow in the legs *j* and *k* can be made the same, with reference to the path about a smaller aperture, by applying a suitable, positive, reset signal to the reset winding 187. If, now, an A.C. signal is applied to the A.C. winding 189 by the source 192, flux reversals are produced about each of the given apertures 184. Each of these flux reversals induces a voltage in the common output winding 190. Thus, the total output voltage is equal to the sum of the two different output voltages induced in the output winding 190. Accordingly, a much larger output voltage, equal to the sum of the two different output voltages, is induced in the output winding 190. A much larger output voltage or impedance can be obtained in the arrangement of Fig. 22 than was the case with a simple two-apertured transfluxor. The transfluxor 180 can be placed in the "full-off" condition by applying a suitable negative setting pulse to the setting winding 185 to reverse the sense of flux, with reference to each of the apertures 184, in the respective legs *k*. Multi-turn windings and series, shunt, or series-parallel connections to a load circuit may be employed, as described previously.

Figure 23:
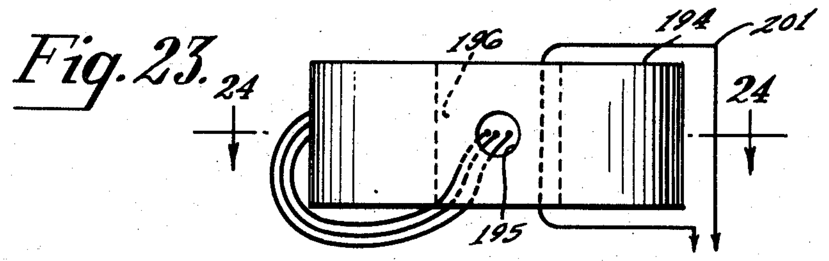
Fig. 23 is a schematic diagram of a magnetic system according to the invention, which employs a transfluxor having a setting aperture and a plurality of output apertures with axes located orthogonally to the axis of the setting aperture.
Figure 24:
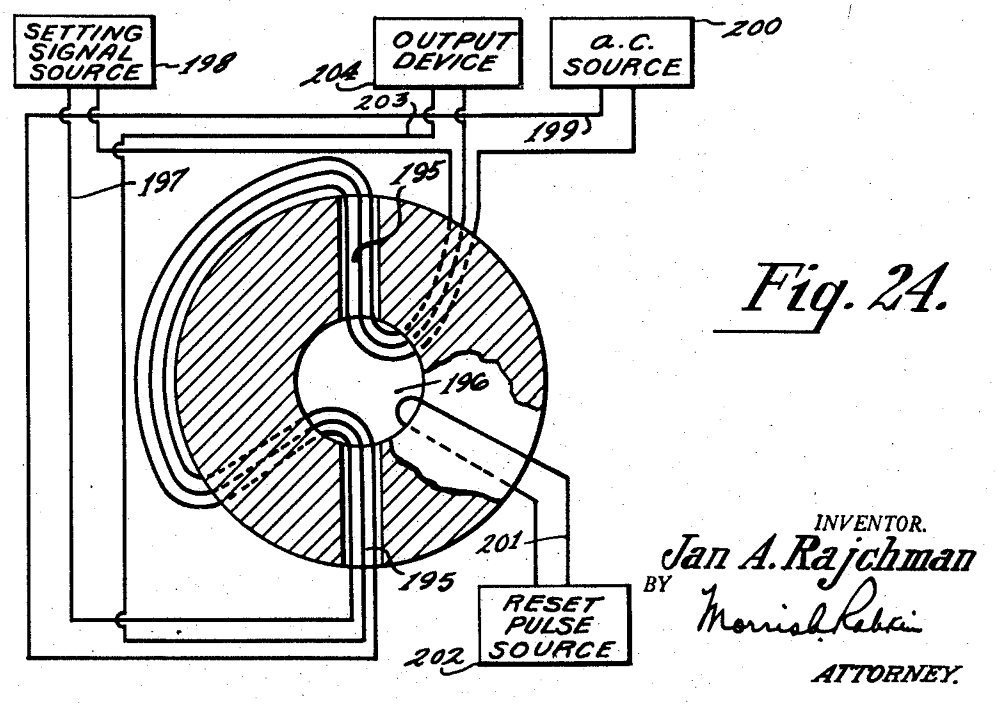
Fig. 24 is a sectional view along the line 24—24 of the transfluxor of Fig. 24.

A similar arrangement for obtaining an increased output voltage or impedance can be obtained in the case of a transfluxor having orthogonal apertures. A cross-section of the transfluxor 194 of Fig. 23 along the line 24—24 is shown in Fig. 24. The transfluxor 194 is provided with two different driven apertures 195 and a single setting aperture 196. The center line of each driven aperture 195 is perpendicular to the center line of the setting aperture 196. The two driven apertures 195 are spaced approximately 180 degrees apart about the circumference of the disk 194.

A setting winding 197, an A.C. winding 199, and an output winding 203 are each threaded in series-aiding relation through the two driven apertures 195. Both terminals of the setting winding 197 are connected to a setting signal source 198, both terminals of the A.C. winding 199 are connected to an A.C. source 200, and both terminals of the output winding 203 are connected to an output device 204. A reset winding 201 is threaded along the top of the transfluxor 194, then through the setting aperture 196, then along the bottom of the transfluxor. Both terminals of the reset winding are connected to a reset pulse setting source 202. Each combination of a driven aperture 195 and the setting aperture 196 operates in the same manner as the transfluxor 62 previously described in connection with the system of Fig. 7. The two different output voltages induced in the output winding 203, in response to an A.C. current, are additive. Thus, the total output voltage or impedance of the transfluxor 194 may be larger than that of a similar two-apertured transfluxor even though the diameter of the driven apertures is smaller than the diameter of the driven aperture of the like two-apertured transfluxor.

*Summary*

There has been described herein improved magnetic systems for obtaining a variable output in accordance with a predetermined input signal. The transfluxor arrangements of the present invention retain all the advantages of the prior transfluxors and, additionally, have a continuous range of response conditions. Two different means for obtaining a range of outputs have been described. A first means includes the provision of varying the geometrical arrangement of the setting aperture. The second means comprises improved methods of operating a two-apertured transfluxor.

According to one geometrical arrangement, three apertures are provided with the contours of the surface of a setting aperture being varied in a predetermined fashion to obtain a desired output response characteristic. Another geometrical arrangement includes the provision of two or more driven apertures located substantially orthogonal to a single setting aperture.

One of the improved arrangements for operating a transfluxor comprises passing a reset signal through the driven aperture and passing the setting signals through the setting aperture. Another comprises passing both the reset and the setting signals through the setting aperture. Still another comprises passing the reset signals through the setting aperture and the setting signals through the driven aperture.

Suitable sources for furnishing the setting, the reset, and the A.C. signals are known in the art and may include known vacuum-tube or magnetic devices. While the A.C. current has been described as being cyclic, it is to be understood that, if desired, the A.C. current can be aperiodic.

Other embodiments of the present invention, in addition to the exemplary embodiments described herein, will be apparent to those skilled in the art.

What is claimed is:

1. A magnetic device comprising a body of magnetizable material having the characteristic of being substantially saturated at remanence and having a first, a second, and a third aperture therein, the material limiting said first aperture defining a surface of shape different from the shape of the surfaces defined by the material respectively limiting said second and said third apertures.

2. A magnetic device comprising a body of magnetizable material having the characteristic of being substantially saturated at remanence and having a first, a second, and a third aperture therein, said second aperture being located between said first and third apertures, and said first aperture having a surface of different shape from that of either of said second and third apertures.

3. A magnetic device comprising a body of magnetizable material having the characteristic of being substantially saturated at remanence and having a first, a second, and a third aperture between opposite surfaces thereof, the limiting material of said first aperture defining a surface having portions perpendicular to a given planar surface of said body and other portions which are other than perpendicular to the given planar surface.

4. A magnetic device comprising a body of magnetizable material having the characteristic of being substantially saturated at remanence and having a first, a second, and a third aperture therein, the limiting material of said first aperture defining a conical surface and the limiting material of each of said second and third apertures defining a cylindrical surface.

5. A magnetic device comprising a body of magnetizable material having the characteristic of being substantially saturated at remanence and having a first, a second, and a third aperture therein, the limting surface of said first aperture defining an oblique frustum, and the limiting surface of each of said second and third apertures defining a cylindrical surface.

6. A magnetic device comprising a body of magnetizable material having the characteristic of being substantially saturated at remanence and having a first, a second, and a third aperture therein, the material limiting said first aperture defining a plurality of cylindrical surfaces, said surfaces having different sizes.

7. A magnetic device comprising a body of magnetizable material having the characteristic of being substantially saturated at remanence and having a first, a second, and a third aperture therein, the material limiting said first aperture defining a stepped cylindrical surface.

8. In a magnetic system, the combination of a body of magnetizable material having the characteristic of being substantially saturated at remanence, said material having a plurality of apertures and a plurality of closed flux paths each about a different one of said apertures, certain portions of said paths being common to each other, and means for dividing the material included in a common portion of one of said flux paths into at least two zones in one of which saturating flux may be established in one sense with reference to said one path and in the other of which saturating flux may be established in the opposite sense with reference to said one path, said means including a first winding linking a second of said paths and a second winding linking a third of said paths, said second and third paths each having a portion respectively in common with different portions of said one path, means for applying a first signal to said first winding, and means for selectively applying other signals to said second winding.

9. In a magnetic system, the combination as claimed in claim 8, and further including means for applying alternating magnetizing forces along said one path for reversing the sense of flux flow in said one zone from the first sense to the opposite sense with reference to said one path, and means responsive to a flux change along said one path.

10. In a magnetic system, the combination of a body of magnetizable material having the characteristic of being substantially saturated at remanence and having a first, a second, and a third aperture in said material, the material limiting said first aperture defining a surface different from the surface defined by the material respectively limiting said second and third apertures, said body having a plurality of distinct flux paths each about at least one of said apertures, a first of said flux paths having two portions respectively in common with portions of two other different ones of said flux paths, means for establishing saturating flux in a first sense with reference to said first flux path in a first of said common portions, and means for establishing saturating flux in the sense opposite to said first sense with reference to said first flux path in a selected part of a different common portion of said first flux path, said selected part being variable in size.

11. In a magnetic system, the combination of a body of magnetizable material having the characteristic of being substantially saturated at remanence and having a first, a second, and a third aperture in said material, the material limiting said first aperture defining a surface having portions other than perpendicular to a given planar surface of said material and other portions perpendicular to the given planar surface, said body having a plurality of distinct flux paths each about at least one of said apertures, a first of said flux paths having two portions respectively in common with portions of two other different flux paths, means for establishing saturating flux in a first sense with reference to said first flux path in a first of said common portions, and means for establishing saturating flux in the sense opposite to said first sense with reference to said first path in a selected part of a different common portion of said first flux path, said selected part being variable in size.

12. In a magnetic system, the combination of a body of magnetizable material having the characteristic of being substantially saturated at remanence, having top and bottom surfaces, and having a first, a second, and a third aperture therein extending from one of said surfaces to the other, the limiting surface of said first aperture having a portion of a surface generated by a straight line which constantly intersects a fixed plane curve in the top surface of said body and passes through a fixed point outside of said fixed plane, said portion being the portion included between the top and bottom surfaces of said body, and wherein the limiting surfaces of said second and third apertures respectively comprise surfaces generated by the movement of straight lines which are constantly parallel to fixed straight lines and each of which intersects a separate, fixed curve each in a plane different from that of the respective fixed straight lines, the said fixed curves being in the top surface of said material, said body having a plurality of distinct flux paths each about at least one of said apertures, a first of said flux paths having two portions respectively in common with portions of two other different ones of said flux paths, means for establishing saturating flux in a first sense with reference to said first path in a first of said common portions, and means for establishing saturating flux in the sense opposite to said first sense with reference to said first flux path in a selected part of a different common portion of said first flux path, said selected part being variable in size.

13. In a magnetic system, the combination as claimed in claim 12, wherein the respective fixed curves are circles.

14. A device for controlling the inductance in an electric circuit throughout a range in response to a setting pulse having a variable amplitude, said device comprising a body of magnetic material having the characteristic of being substantially saturated at remanence and having a first, a second, and a third aperture in said material, the material limiting said first aperture defining a different geometrical surface from the surfaces respectively defined by the material limiting said second and said third apertures, a setting circuit linked to said first aperture for receiving variable amplitude setting pulses, and a second circuit linked through a second of said apertures for receiving alternating currents, said first and second apertures being adjacent to one another.

15. In a magnetic system, the combination of a body of magnetizable material having the characteristic of being substantially saturated at remanence and having a first, a second, and a third aperture therein, the material defining said first aperture comprising a surface generated by a first planar curve which revolves about a first axis in the plane of said curve for a part of the way, and a second planar curve which revolves about a second axis in the plane of said second curve until the surface generated by said second curve intersects the surface generated by said first planar curve, a plurality of distinct flux paths each about at least one of said apertures, a first of said flux paths having two portions respectively in common with portions of two other different flux paths, means for establishing saturating flux in a first sense with reference to said first flux path in a first of said common portions, and means for establishing saturating flux in the sense opposite to said first sense with reference to said first flux path in a selected part of a different common portion of said first flux path, said selected part being variable in size.

16. In a magnetic system, the combination as claimed in claim 15, wherein the transition of the surface near the junction of the surfaces generated by said first and second curves is gradual.

17. In a magnetic system, the combination as claimed in claim 15, wherein said first and second axes are coincident.

18. In a magnetic system, the combination as claimed in claim 15, wherein one of said planar curves is a straight line.

19. In the method of operation of a magnetic system having a body of magnetic material capable of being substantially saturated at remanence, said body having at least three apertures and distinct, closed flux paths a different one individually around each of said apertures, a first of said flux paths around a first one of said apertures having two portions respectively in common with portions of the two other different paths, the steps of applying a magnetizing force around a second one of said apertures to establish a flux flow along the path around said second aperture thereby to saturate at remanence one of said portions in one sense along said first path, applying a magnetizing force around a third of said apertures to establish a flux flow along the third of said paths thereby to saturate at remanence the other of said portions in the sense opposite to the one sense along said first path, and applying a variable magnetizing force selectively around the third of said apertures thereby to saturate at remanence one part of said other portion in the same sense as the one sense along said first path, the size of said one part being a function of said variable magnetizing force.

20. In a method as recited in claim 19, the further steps of applying an alternating magnetizing force along said first path, and detecting a flux change along said first path resulting from said alternating magnetizing force.

References Cited in the file of this patent

UNITED STATES PATENTS

| | | |
|---|---|---|
| 2,519,426 | Grant | Aug. 22, 1950 |
| 2,682,632 | Cohen | June 29, 1954 |
| 2,802,953 | Arsenault | Aug. 13, 1957 |
| 2,810,901 | Crane | Oct. 22, 1957 |

OTHER REFERENCES

"The Transductor Amplifier," by Ulribe Krabbe, 1947, pp. 1–176 (Figs. 3, 4 and pp. 26–27 relied on).

UNITED STATES PATENT OFFICE

CERTIFICATION OF CORRECTION

Patent No. 2,962,719 November 29, 1960

Jan A. Rajchman

It is hereby certified that error appears in the above numbered patent requiring correction and that the said Letters Patent should read as corrected below.

Column 8, line 6, for "radical" read -- radial --; column 16, line 46, for "saturation" read -- saturating --.

Signed and sealed this 13th day of June 1961.

(SEAL)
Attest:

ERNEST W. SWIDER
Attesting Officer

DAVID L. LADD
Commissioner of Patents